(12) United States Patent
Alldredge et al.

(10) Patent No.: US 11,269,478 B2
(45) Date of Patent: Mar. 8, 2022

(54) ADAPTED OVERLAY HELP SYSTEM

(71) Applicant: ANSYS, INC., Canonsburg, PA (US)

(72) Inventors: Gregory Mark Alldredge, Commerce City, CO (US); Frank E. DeSimone, Bolton, MA (US); Sanjaykumar Ranganayakulu, Canonsburg, PA (US); May Salim Hourani, Phoenix, AZ (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/948,091

(22) Filed: Sep. 2, 2020

(65) Prior Publication Data

US 2022/0004286 A1 Jan. 6, 2022

Related U.S. Application Data (60) Provisional application No. 63/048,371, filed on Jul. 6, 2020.

(51) Int. Cl.
*G06F 3/0481* (2013.01)
*G06F 9/451* (2018.01)

(52) U.S. Cl.
CPC ............ *G06F 3/0481* (2013.01); *G06F 9/453* (2018.02)

(58) Field of Classification Search
CPC ................................ G06F 3/0481; G06F 9/453
See application file for complete search history.

(56) References Cited

U.S. PATENT DOCUMENTS

| | | | | |
|---|---|---|---|---|
| 7,639,267 | B1* | 12/2009 | Desimone | G06T 15/00 345/619 |
| 10,650,172 | B1* | 5/2020 | Pajerski | G06F 30/17 |
| 2007/0113180 | A1* | 5/2007 | Danninger | G06F 9/453 715/705 |
| 2007/0179976 | A1* | 8/2007 | Arvin | G06F 30/00 |
| 2008/0018745 | A1* | 1/2008 | Iyoda | H04N 9/3194 348/207.99 |
| 2009/0037815 | A1* | 2/2009 | Muir | G06F 9/453 715/705 |
| 2010/0088623 | A1* | 4/2010 | Ichino | G06F 3/0481 715/766 |
| 2010/0302242 | A1* | 12/2010 | Buchanan | G06F 30/00 345/420 |
| 2013/0268853 | A1* | 10/2013 | Gommier | G06F 3/0482 715/702 |

(Continued)

*Primary Examiner* — Tadesse Hailu
(74) *Attorney, Agent, or Firm* — Womble Bond Dickinson (US) LLP (57) ABSTRACT

An improved help system for a user interface of a computer program uses a mask with one or more cutouts to focus a user's attention to the cutout portion(s) and uses the mask to display dynamically positioned help information, such as roll over hints, in the available space on the mask. An intelligent placement algorithm is used to control placement of the help information to avoid overlaps among the help information displayed on the mask. The portions of the user interface (UI) under the mask not selectable while under the one or more masks and the other portions of the UI are selectable while in the one or more cutouts. The roll over hints can be similar to coach marks that include arrows that point from the help information on the mask to an associated UI command in a cutout.

20 Claims, 10 Drawing Sheets

(56) References Cited

U.S. PATENT DOCUMENTS

| | | | |
|---|---|---|---|
| 2014/0173474 A1* | 6/2014 | Klemenz | G06F 3/0481 |
| | | | 715/765 |
| 2018/0033212 A1* | 2/2018 | Schaarschmidt | G06F 30/00 |
| 2018/0336010 A1* | 11/2018 | Mukherjee | G10L 15/22 |
| 2020/0004225 A1* | 1/2020 | Buller | B29C 64/393 |
| 2020/0159871 A1* | 5/2020 | Bowen | G06F 30/10 |

* cited by examiner

ADAPTED OVERLAY HELP SYSTEM

This application claims priority to and the benefit of U.S. provisional patent application No. 63/048,371, filed Jul. 6, 2020 and is hereby incorporated herein by reference.

BACKGROUND

This application relates to the field of user interfaces for computer programs, and more specifically relates to the field of help systems for user interfaces of computer programs.

Help systems for computer programs include systems that display help information as a user moves the cursor and help systems that display panels (in separate windows) that contain help information that resemble a user manual. Also, there are help systems that provide coach marks. These systems tend to be constrained by the amount of available screen space. Moreover, these systems are not fully responsive to how a user interacts with the program while the help system is active.

SUMMARY OF THE DESCRIPTION

An improved help system uses a mask with cutouts to focus a user's attention to the cutout portion and uses the mask to display dynamically positioned help information in the available space on the mask. An intelligent placement algorithm can be used to control placement of the help information to avoid overlaps among the help information displayed on the mask.

The mask (which can be partially transparent or translucent) can block user interaction with user interface (UI) objects under the mask and the cutout(s) allow user interaction with UI objects in the cutout(s). The cutout can be based on the context and state of the program so it varies dynamically based on the context (such as position of cursor) and state (such as different states for different selected commands or program states that have different help items). Thus, the cutouts can change to show relevant UI in the cutout as the user interacts with the program. The cutouts can dynamically change size and shape and can split or merge based upon the position of the cursor or other user input. Text with associated arrows pointing to UI objects can be dynamically placed as a user moves the cursor; each arrow shows the association between the help information and the corresponding UI object. The arrows and help information are dynamically positioned based on available screen space on the mask; examples of algorithms for these dynamic placements are also described. Thus the location of the help information and associated arrows change automatically to avoid overlaps (among the help information and arrows) and to fit the help information and arrows in the available space on the mask.

A data processing system in one embodiment can perform a method with the following operations: (1) receiving a user input to invoke a help system for the computer program; (2) displaying a user interface (UI) of the computer program with one or more masks over portions of the UI and displaying one or more cutouts around other portions of the UI, the portions of the UI under the mask not selectable while under the one or more masks and the other portions of the UI are selectable while in the one or more cutouts, the one or more cutouts appearing to be cut out of the one or more masks; and (3) displaying dynamically positioned help information on the one or more masks, the help information being dynamically positioned in response to user interaction with the computer program and being positioned to avoid overlap among each instance of help information. In one embodiment, this method can further include the operations of: sorting each item of the help information based on screen space size to be occupied by each item; sampling available screen space at a plurality of points in the computer program's screen space; ranking each of the plurality of points based on one or more criteria; and positioning each item of the help information based on the ranking. In one embodiment, the criteria can comprise one or more of: (1) overlap with the one or more cutouts; (2) distance from the associated UI to a potential location; or (3) overlap with a reserved location; or (4) a preferred direction from the associated UI to the item. In one embodiment, the sampling can be performed in two phases and the two phases can comprise: a first sampling at a first resolution of an entire screen size of the computer program; and then a second sampling around highest ranked locations from the first sampling, the second sampling at a second resolution that is higher than the first resolution. In one embodiment, the positioning can be based on the highest (e.g., largest) ranking score, and once an item of help information is positioned at a first location, the first location is reserved in future rankings.

In one embodiment, the help system of the UI of the computer program can include a plurality of cutouts, and the cutouts that are displayed at any particular time are based on the selected state of the computer program (e.g., the particular command selected in the ribbon of the computer program can determine the state of the program for the purposes of the help system). Thus, the state of the computer program can vary during the time that the help system is invoked, resulting in different cutouts depending upon the selected state. In one embodiment, the cutouts are not restricted to quadrilaterals and can be arbitrary shapes (e.g., circular, ellipse, oval, shapes determined by menus in the UI, etc.) that can merge or split in response to user interactions with the program while in the help mode.

In one embodiment, an item of help information can be dynamically positioned in response to user input that positions a cursor over a UI element that is associated with the item, and the item of help information can be referred to as a roll over hint displayed on the one or more masks. In one embodiment, the user not constrained in an order in which states are selected while the help system is invoked and the help system does not enforce a workflow. In other words, the user is not constrained to follow a particular order in exploring or using UI elements in the program, and the help system will respond to the user's inputs based on those inputs as opposed to a constrained sequence of expected or required actions by the user.

An appendix included with this application includes a video that shows an example of a help system that includes at least some of the embodiments described herein.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, a help system can include an overlay that is displayed over the user interface (UI) of a computer program. In one embodiment, the overlay can be displayed in response to a request from a user to provide help information; this request can occur through the selection of a help command (e.g., from a pull down menu) or a set of one or more keystrokes, etc. The overlay can include one or more masks that are partially transparent over the UI of the program; the mask can cover most of the UI in some cases leaving one or more cutouts from the mask that expose the UI. The mask can be a blurred region or merely partially transparent. The blurred region can prevent user interaction with obscured commands and controls and can reduce the cognitive load on the user by focusing their attention to the regions shown in the cutouts. The mask also serves as a canvas on which the help information can be displayed. The cutouts display the UI in the same manner as before the help system was invoked. Moreover, the UI commands and controls in the cutout regions are fully usable and interactive while in the help mode, but the UI commands and controls under the mask are not, in one embodiment, usable or interactive while in the help mode. In alternative embodiment, a user may invoke a covered command under the mask by using a right click selection or pressing and holding an option or control key while selecting the command with a cursor or other techniques that are not normally used to invoke or select commands. In this alternative embodiment, certain commands (such as commands used to switch states in the help mode) may be invoked even when covered by the mask; for example, a user can use the commands in the cutouts but not the commands under the mask except for certain commands (e.g., commands in the program's ribbon or other menu structure) in order to switch states of the program.

Figure 1:
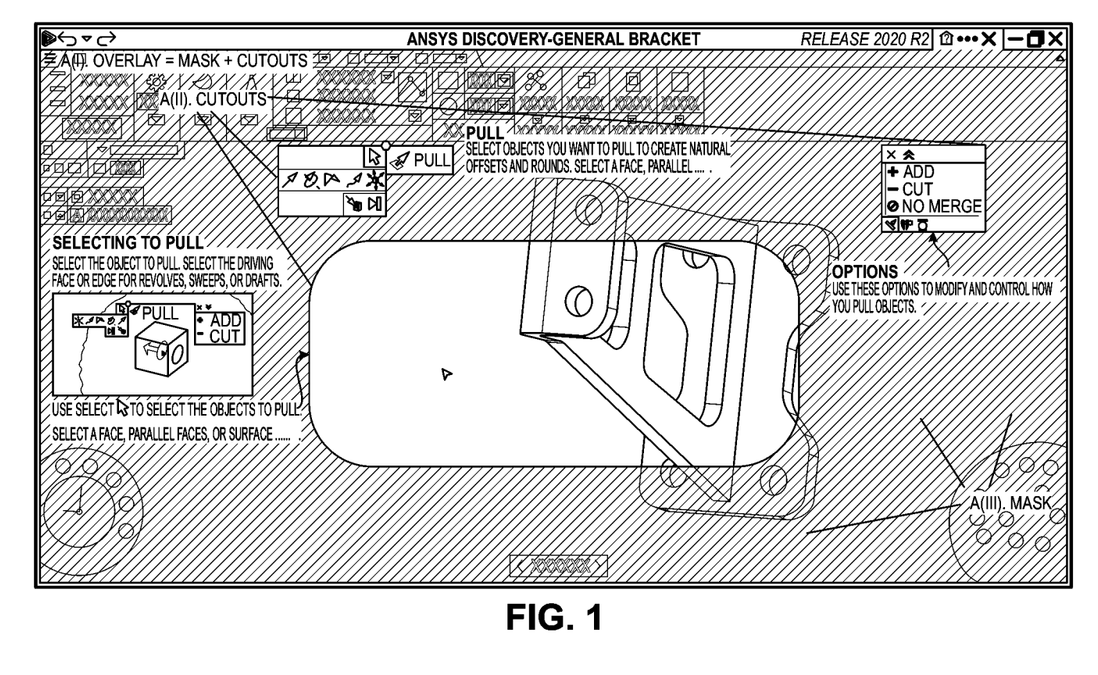
FIG. 1 shows an example of an overlay that includes a mask and cutouts for a help system of a computer program.

FIG. 1 shows an example of an overlay that includes a mask and several cutouts. In this example shown in FIG. 1, a central cutout shows a simulated object that is being designed or analyzed in the computer program. The two smaller cutouts show various menus that contain commands that can be selected by a user; these commands can cause operations to be performed in the program to manipulate the object or perform other operations on the object. These commands can be commands that are common in computer aided design (CAD) software or computer aided engineering (CAE) software or simulation software such as computer programs from ANSYS INC of Canonsburg, Pa. Different states of the program can have different sets of commands that are available; one state, selected by a user by selecting a command in the ribbon of the program's UI, can have one set of commands (and associated help information), and another state can have a different set of commands (and different associated help information). Examples are provided below about how these different states result in different cutouts and different sets of help information being displayed.

Figure 2:
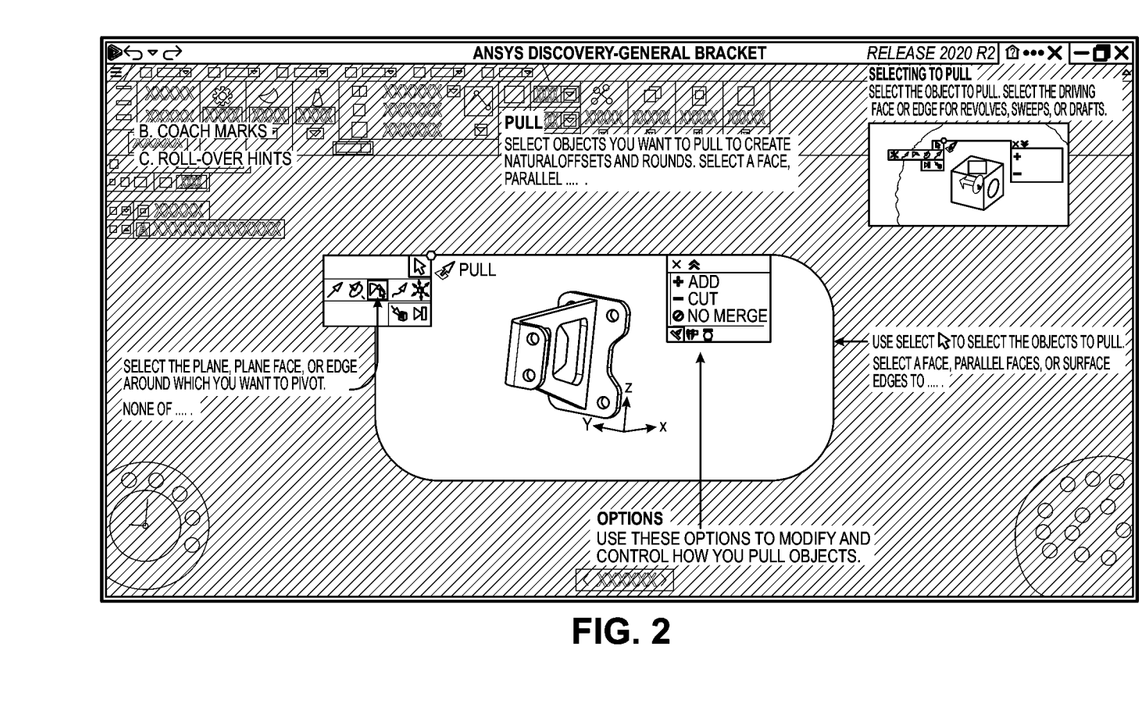
FIG. 2 shows an example of help information that can be displayed on a mask according to one embodiment; such help information can be referred to as coach marks.
Figure 3:
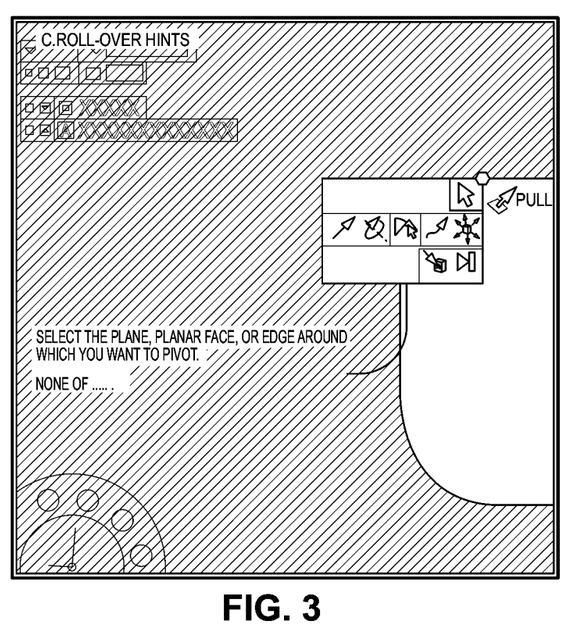
FIG. 3 shows an example of help information that can be displayed on a mask in response to positioning a cursor over a UI item (such as a command in a menu of commands); such help information can be referred to as a roll over hint (when a mouse is used to move the cursor and "roll over" a UI item).

FIGS. 2 and 3 show examples of a help system that displays coach marks and roll over hints on the mask surrounding the cutout that includes two menu structures (such as the one menu structure that includes the commands:

Add; Cut; and No merge and also includes a set of options commands at the bottom of the menu structure). All of the commands in these two menu structures are active so the user can interact with them by selecting them to cause them to be executed as a result of the selection. Thus, the cutout includes a working space that displays the object being designed or engineered and also includes the two menu structures. In the examples shown in FIGS. 2 and 3, there are two coach marks and one roll over hint. One of the coach marks points to, via its associated arrow, the cutout while the other coach mark points to the options commands at the bottom of the menu structure). A coach mark can include a block of one or more of: text, images, links, or animation (e.g., video). The association between the coach mark and the command is shown by the arrow between the block of help content (e.g., text) and the command. In other words, the text is drawn relative to specific controls or commands in the cutout with an arrow indicating the relationship between the text and the control or command being explained by the help content. The coach marks are static in the sense that they are displayed while the cursor is in any position over the window while the roll over hints are only displayed when the cursor is over the corresponding UI element associated with the roll over hint. The roll over hint is displayed as a result of placing the cursor (e.g. by moving a mouse that controls the cursor's position in the window) over the command used to select a pivot plane or edge. Once the cursor is moved away from the icon for this command, the roll over hint will be removed from the screen. These roll over hints can be displayed with a bright accent color for the arrow and outlines around the command being described by the roll over hint. All of this help information is based upon the current state of the program; in this example shown in FIGS. 2 and 3, the user has selected a "pull" command (to create offsets and rounds), resulting in the display of relevant help information about this command (while not showing potentially many other items of help information for many other commands or states of the program). In one embodiment, all of this help information can be dynamically positioned based upon criteria described below so that none of the help information overlaps when displayed together at the same time. As explained further below, the cutouts can have arbitrary shapes (e.g., circular, oval, hexagon, etc.), and they can change, separate or merge together to enclose UI as the program itself changes. The shapes can match the UI elements enclosed in the cutout so that the cutout tightly encloses the shape of the UI elements (e.g., a command or set of commands in a menu structure). The help content, such as help content 109A, may completely obscure the mask below the help content or the mask may be partially visible through the help content.

Figure 4A:
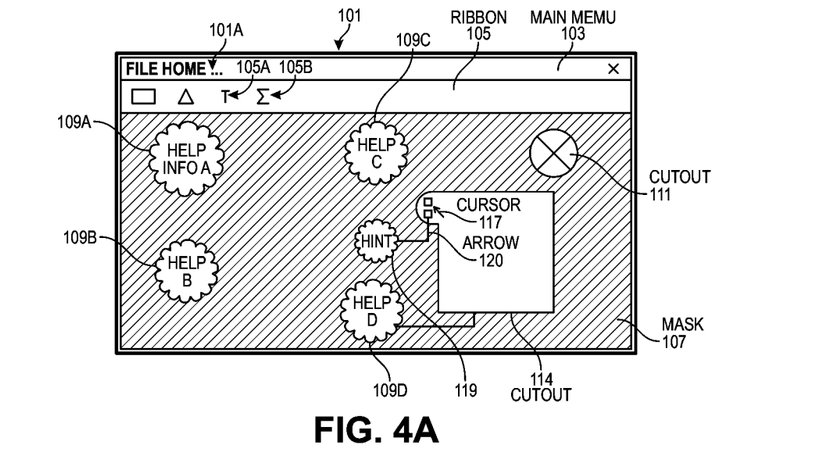
FIG. 4A shows an example of a UI of a help system that includes a mask and cutouts and other aspects according to one embodiment.
Figure 4B:
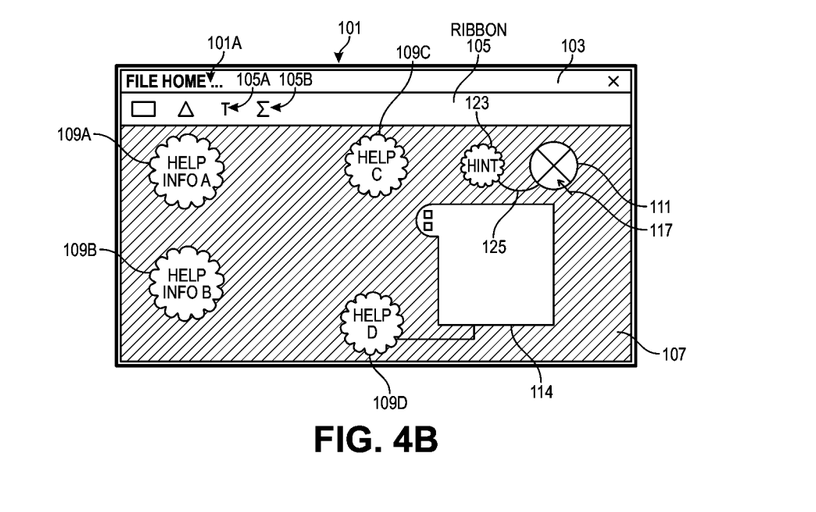
FIG. 4B shows an example of the help system in FIG. 4A after a user has moved the cursor to a different UI item.

FIGS. 4A and 4B show an example of a user interface of, for example, a CAD computer program or CAE computer program or multiphysics simulation computer program according to one embodiment. The window 101 of the computer program includes a main menu 103 and a ribbon 105; this UI is similar to the UI common to applications that run on the Windows 10 operating system from Microsoft Inc. of Redmond, Wash. The main menu 103 includes a set of commands (e.g., "File", "Home", etc.), and a user can select one of these commands to then cause the display of a set of possible commands in the ribbon 105, such as commands 105A and 105B; the set of commands displayed in the ribbon 105 can depend upon the command selected in the main menu. The particular combination of the command selected in the main menu 103 and the command selected in the ribbon can determine the state of the program for the purposes of the help system in one embodiment. FIGS. 4A and 4B show the program in a state as a result of the user having selected a command in the main menu 103 and having selected a command in the ribbon 105 (e.g., command 105A). As a result of these selections, a state for the help system is selected and this determines the available help content, such as coach marks and roll over help, and this also determines the location(s) and size(s) of the cutouts and menus in the cutouts that are displayed. In the examples shown in FIGS. 4A and 4B, the help content includes help content 109A, 109B, 109C, and 109D, with 109D being in the form of a coach mark with an associated arrow pointing to the cutout 114. This help content is displayed on the mask 107 that blurs the underlying UI not shown in the cutout 114. This help content can be rich content that includes text, images, links, animation, etc. A cutout 111 shows a set of commands arranged in a circle. A set of commands in the cutout 114 are shown in the upper left corner of the cutout 114, and the user has positioned the cursor 117 over one of those commands, resulting in the display of the hint 119 with its associated arrow 120 that shows the association between the hint 119 and the command under the cursor 117. In one embodiment, as long as the cursor 117 is over that command, the hint 119 will be displayed and when the cursor 117 is moved away, the hint 119 will not be displayed. This can be seen in FIG. 4B in which the cursor has been move over a command on the bottom portion of the cutout 111; at this point in time, the hint 119 is not displayed but the hint 123 (and its associated arrow 125) are displayed while the cursor is positioned over the command on the bottom portion of the cutout 111.

Figure 5A:
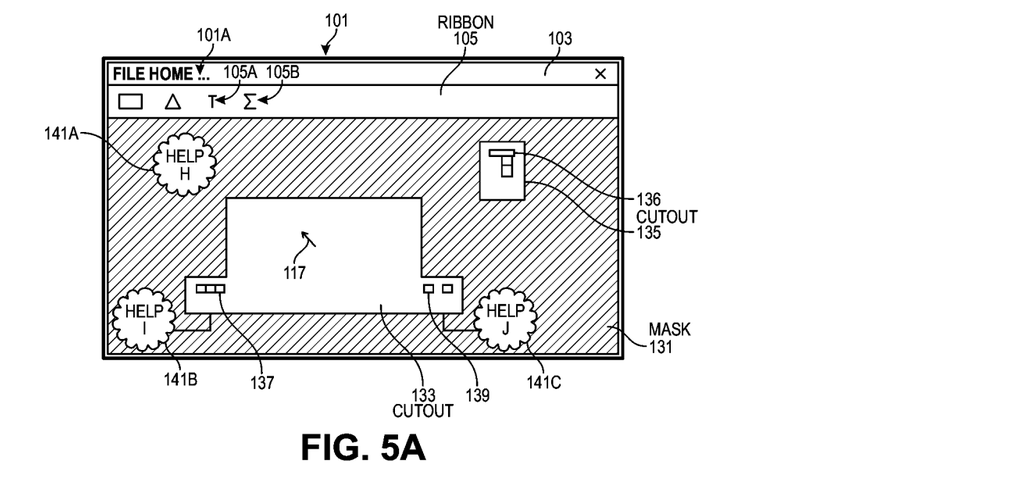
FIG. 5A shows another example of a help system shown in FIG. 4A after a user has selected a different command from the ribbon of the program to cause the state of the program to change and to cause the help system to display a different set of help information based upon the new state of the program.
Figure 5B:
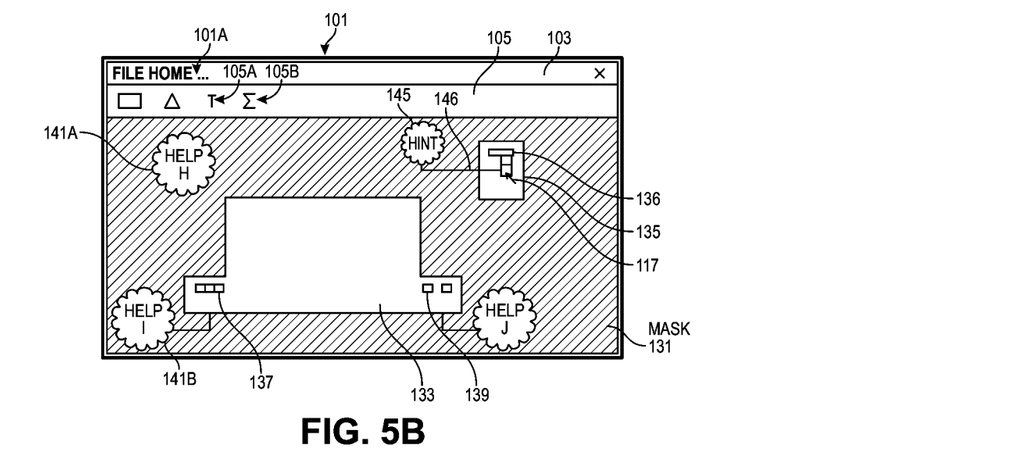
FIG. 5B shows an example of the help system in FIG. 5A after the user has moved the cursor to a UI item, thereby causing the display of a roll over hint.

FIGS. 5A and 5B show an example of the computer program in FIGS. 4A and 4B after the user has changed the state of the program. For example, the user may have selected the command 105B to change from the state shown in FIGS. 4A and 4B to the state shown in FIGS. 5A and 5B. As a result of this selection, a new state for the help system is selected and this determines the available help content, such as coach marks and roll over help, and this also determines the location(s) and size(s) of the cutouts and menus in the cutouts that are displayed. As shown in FIGS. 5A and 5B, the cutouts have changed; in this new state, the help system shows cutouts 133 and 135. The cutout 133 encloses a work space and a set of commands 137 and a set of commands 139; the cutout 135 enclose a set of commands 136. In the examples shown in FIGS. 5A and 5B, the help content includes help content 141A, 141B, and 141C, with 141B and 141C being in the form of coach marks with associated arrows pointing to respective commands in the cutout 133. The help content can provide general information about pertinent commands that are available in the current state. The help content 141B can describe one or more commands in the set of commands 137, and the help content 141C can described one or more commands in the set of commands 139. This help content is displayed on the mask 131 that blurs the underlying UI not shown in the cutout 133 or the cutout 135. This help content can be rich content that includes text, images, links, animation, etc. The available help content in the state shown in FIGS. 5A and 5B can be totally different than the help content that is available in the state shown in FIGS. 4A and 4B and can be relevant to the commands or controls that are available in the state shown in FIGS. 5A and 5B (and the help content that is available in the state shown in FIGS. 4A and 4B can be relevant to the commands or controls that are available in the state shown in FIGS. 4A and 4B). The help system can automatically make the switch to the different available help content and cutouts in response to the user's change of the program's state (e.g., by selecting a particular command in the ribbon). In the example shown in FIG. 5A, the cursor is in the work space of the cutout 133 and is not over a UI element such as a command, and thus no roll over hint or help content is displayed. In the example shown in FIG. 5B, the user has moved the cursor so that it is positioned over the bottom command in the set of commands 136 in the cutout 135, and as a result, the help system displays the roll over hint 145 with it associated arrow 146 that points to the bottom command. The hint 145 can be dynamically positioned relative to the other help content on the mask 131 using one of the methods described below.

Figure 6:
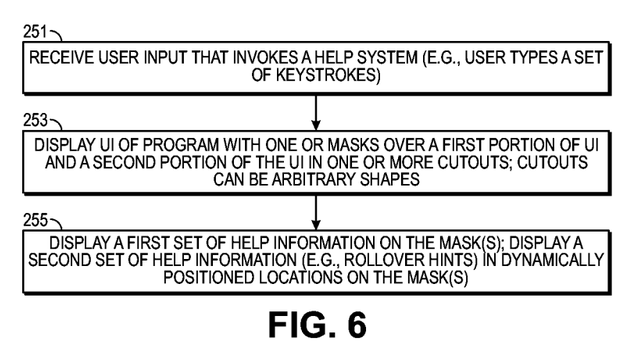
FIG. 6 is a flowchart that shows a method to present help information according to one embodiment described herein.

The following section provides examples of various methods that can be performed with the one or more embodiments of the help system described herein. FIG. 6 shows an example of one such method. In operation 251 shown in FIG. 6, the help system can receive a user input that invokes the help system. For example, the user can type a set of keystrokes (e.g., F1 on a Windows system) or select a help icon (for example a "?" icon) displayed in the UI of the program, etc. Then in operation 253, the program can display a user interface with one or more masks over a first portion of the user interface and also display a second portion of the user interface in one or more cutouts. The cutouts can be arbitrary shapes and can include user interface elements such as commands or controls within the cutouts. In operation 255, the system can display a set of help information on the mask(s) such as a first set of help information that can be, for example, coach marks. The system can also display in operation 255 a second set of help information, such as roll over hints in dynamically positioned locations on the mask. In one embodiment, the method shown in FIG. 6 can use a dynamic positioning method such as the method shown and described herein; see for example FIG. 9A. The method shown in FIG. 6 can use, in one embodiment user interfaces which are similar to the user interfaces shown in FIGS. 4A, 4B, 5A, and 5B.

Figure 7:
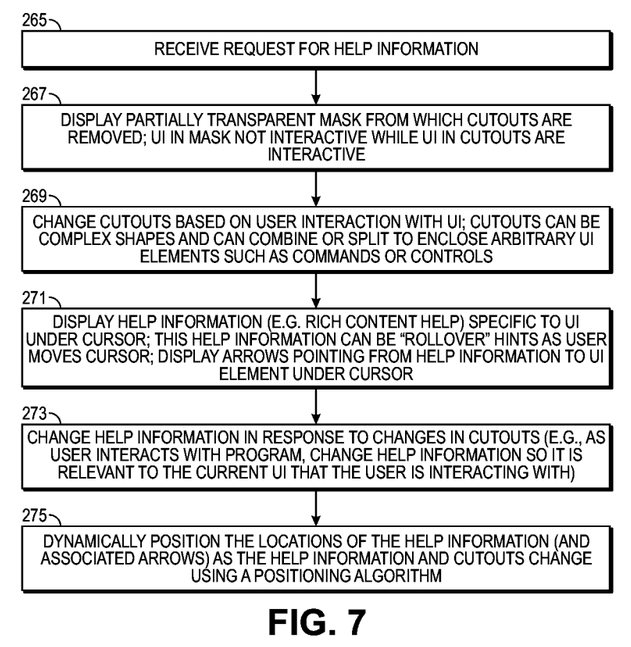
FIG. 7 is a flowchart that shows a method to present help information according to one embodiment described herein.

A method shown in FIG. 7 illustrates further aspects which can be used in one or more embodiments described herein. In operation 265, the program can receive a request for help information. This request can be from a keystroke entered by the user or the selection of a help icon (e.g., a "?" icon) displayed in the user interface of the program. In operation 267, the program can then display a partially transparent mask from which cutouts are removed. In one embodiment, user interface components or elements such as commands under the mask are not interactive and cannot be selected to cause their execution by the user while user interface elements, such as commands, in the cutouts are interactive and can be selected by the user to cause the commands to be executed. In operation 269 the system can change the cutouts based upon user interaction with the user interface; for example, the user can switch the state by selecting a different command on a ribbon of the program. The cutouts can be complex shapes and can be combined or split to enclose arbitrary user interface elements such as commands or controls. In operation 271, the help system can display help information, such as rich content help that is specific to the user interface under the cursor; this help information can be referred to as roll over hints as a user moves the cursor. In addition, the system can display arrows pointing from the help information to the particular user interface element under the cursor. In operation 273, the help information can change based upon changes to the cutouts such as, when the user interacts with the program, the cutouts change and then the help information changes so that it is relevant to the current user interface that the user is interacting with. In one embodiment, each time the help information changes such that new help information is added or removed or in other ways changed, the system can dynamically determine the locations of the help information in operation 275. This repositioning includes repositioning associated arrows as the help information changes or as the cutouts changed. In one embodiment, the positioning can be performed by one of the methods described herein, such as the method shown in FIG. 9A.

Figure 8:
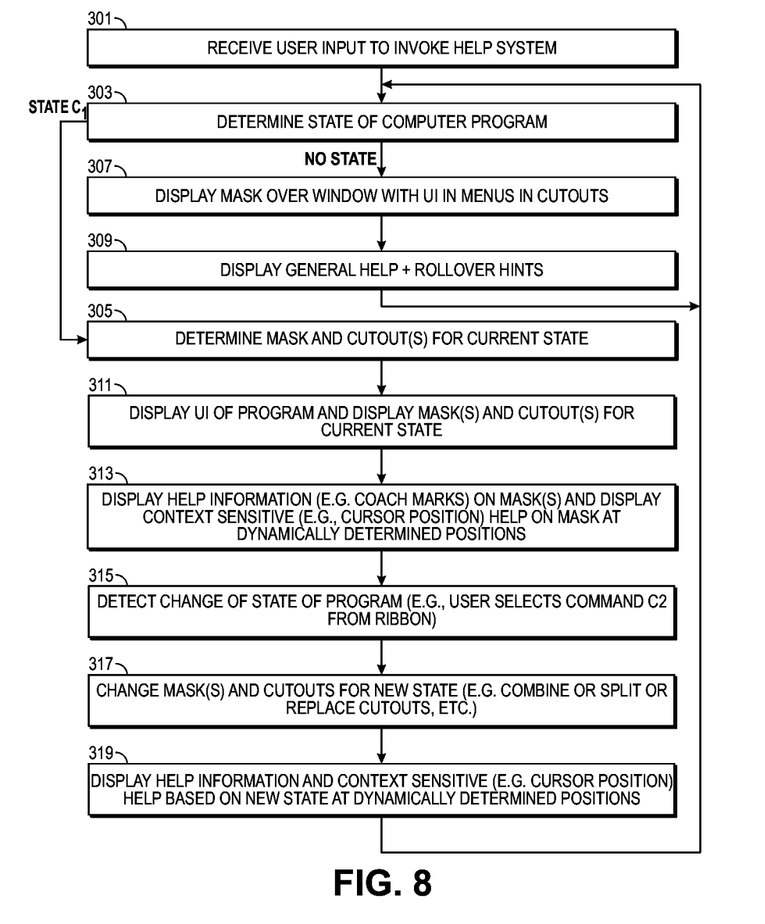
FIG. 8 is flowchart that shows a method to present help information according to one embodiment described herein.

FIG. 8 shows an example of how the help system can monitor the state of the program and display relevant help information based upon the state. In operation 301, the help system can receive a user input that requests help from the system thereby invoking the help system. This can occur by a keystroke from the user or by the selection of an icon for help (e.g., "?"). In response to the user input received in operation 301, the help system determines the state of the program in operation 303. In one embodiment, the help system can determine that there is no selected state, which can exist when the program is first launched, for example. If no state has been selected, then processing can proceed to operation 307, in which the help system displays a mask over the window and displays the user interface containing menus in cutouts in the window. In this case, the entire UI is masked except for those portions containing commands or menus which are shown in cutouts. This display of help information represents a general state of help information which can be displayed in operation 309, and can include the display of coach marks and roll over hints. In a stateless state, the entire user interface of the program can be hidden behind the mask except for user interface commands or controls contained in menu structures, etc. Processing can revert back to operation 303 to continue determining the state of the program. If operation 303 determines that a state does exist, such as a state C1, then processing proceeds to operation 305. In operation 305, the system determines the appropriate mask and cutouts for the current state. Then in operation 311, the system displays the user interface of the program and displays one or more masks and one or more cutouts that are appropriate for the current state. In operation 313, the system displays help information, such as coach marks on the masks and displays context sensitive information, such as information based upon cursor position on the mask to dynamically determine positions. In one embodiment, operation 313 can employ the dynamic positioning methods described herein, such as the method shown in FIG. 9A. In operation 315, the help system can detect a change of state of the program; this can occur by the user selecting a different command from the ribbon or performing another operation which changes the state of the program in a way that is relevant to the help system such that the help system recognizes that a different set of help information is to be provided in the new state. In operation 317, in response to the change of state, the help system changes the one or more masks and one or more cutouts for the new state. This can involve combining or splitting or replacing cutouts, etc. Then in operation 319, the system displays new help information and context-sensitive help information based on the new state at dynamically determined positions using, for example, the method shown in FIG. 9A. Processing can revert back to operation 303 as shown in FIG. 8 to allow the user to continue to use the help system and to continue to change states. Thus, the method shown in FIG. 8 allows the user to cycle through multiple different states of the computer program and still interact with the computer program while receiving relevant help information within each state.

A change of state for purposes of at least some of the embodiments described herein can be any change of the program or program's UI that will result in a different set of help content being available for presentation (e.g., displayed on a mask or audio or both) to a user. Thus, a change in state will result, in one embodiment, in an evaluation of the space requirements of the new help content based upon the new state, and this evaluation can be performed using the method of FIG. 9A. How a user invokes the new state can vary between embodiments. For example, in one embodiment, the main menu and the program's ribbon (or other menu structure(s)) can remain active while in the help mode (and while the mask(s) are displayed), and the user can switch among states by selecting commands in the menu structures such as the program's ribbon, etc. Alternatively, selective commands in cutouts can allow the user to switch among states by selecting different commands shown in the cutouts.

Figure 9A:
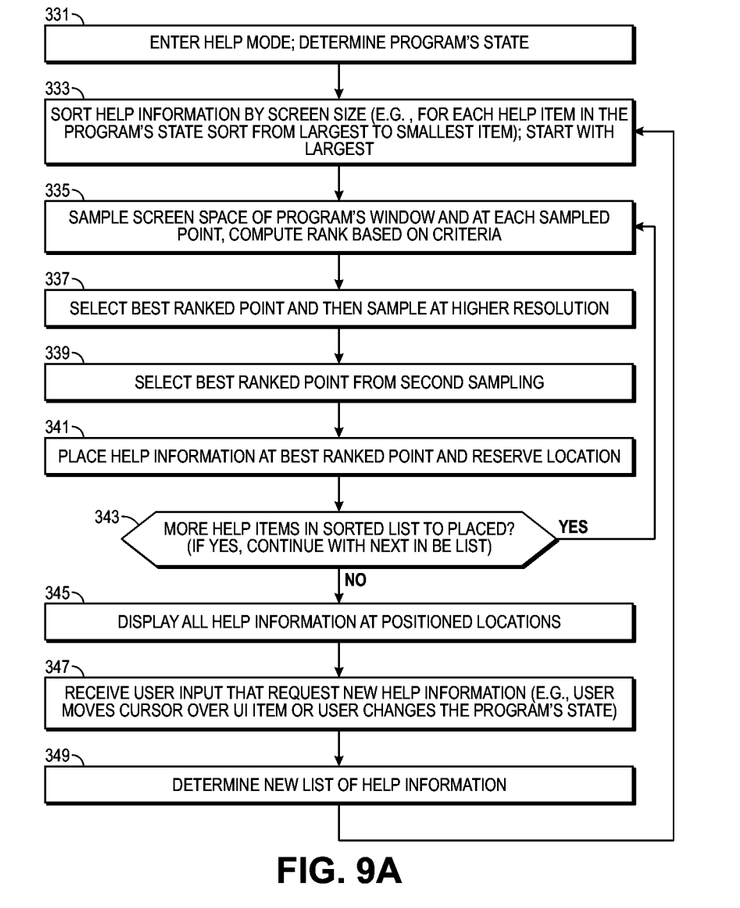
FIG. 9A shows a flowchart that illustrates a method, according to one embodiment, for dynamically positioning help information to avoid overlaps among the help information.

The methods described herein, such as the methods shown in FIGS. 6, 7, and 8, can use techniques for dynamically positioning help information to place the help information on the screen, such as on the masks, in a manner to avoid overlap between any of the help content. Placement of help content can be calculated using a heuristic waiting algorithm. Several criteria can be used to rank the viability of potential locations for each item of help content. Points on the screen can be sampled evenly across the available screen space of the window for the program, and a weight for each of the points can be calculated. A location with the best overall score can be determined, and in one embodiment, can be further refined using a binary search approach in which points are sampled at progressively finer resolutions near the high-scoring point from the initial sampling operation. This can be done for each help item that needs to be placed, and in one embodiment, the help item can be placed in the order from largest to smallest in terms of screen space. Once all of the help content is placed, arrows are drawn to connect each help item to the associated user interface item. FIG. 9A shows an example of a method that can use this algorithm. In operation 331, the system can determine that it has entered a help mode and can determine the program's current state. In operation 333, the system can sort the help information in the current state based upon screen size of each help item. In one embodiment, each help item in the program's current state can be sorted from largest to smallest and the method can start with the largest help item in terms of screen space.

Then in operation 335, the system can sample the screen space of the program's window and at each sampled point, calculate a rank based upon criteria. In one embodiment, the criteria can include overlap with the reserved space; distance from associated user interfaces; and preferred angle. The criteria based on overlap with reserved space can take into account points within regions that are reserved. If a point within a region has already been reserved, then the algorithm gives the point of very low score. Reserved regions can include cutouts or locations where other help content have been placed. The criteria relating to distance from associated user interface can be used in the case of help content where an arrow will be drawn from the help content to some user interface element; better scores are given to locations that are at an ideal distance from the associated controls in the user interface. Locations that are too close or too far from this ideal distance will receive lower scores. The criteria relating to a preferred angle can be used when a preferred direction is specified for an item of help content. For example, a preference could be assigned that the help content be placed below the associated user interface on a screen. Locations with the fewest degrees of separation from the preferred direction will be given higher scores.

In operation 337, the system can then select the best ranked point and can then sample at a higher resolution in one embodiment. In operation 339, the system can then select the best ranked point found from the second sampling operation in operation 337. In an alternative embodiment, the method can skip the second sampling operation such that the best ranked point is selected in operation 337 and a second sampling is not performed. Then in operation 341, the system can then place the help content at the best ranked point and reserve the location for that help content. Then in operation 343, the system determines whether or not there are more help items in the sorted list that need to be placed. If there are, then processing reverts back to operation 333 to process the next help item in the list. If all help items have been placed, then processing proceeds to operation 345, in which all of the help information is displayed at the locations which were calculated using the method shown in FIG. 9A. At some point in time, the system can receive, in operation 347, user input that requests new help information. This can work occur as a result of a rollover hint in which the user moves the cursor while within the current program's state or as a result of changing the program's state by selecting, for example a new command in the ribbon of the computer program. Then in operation 349, the system determines a new list of help information which is to be made available as a result of operation 347. Then processing reverts back to operation 333 as shown in FIG. 9A.

Figure 9B:
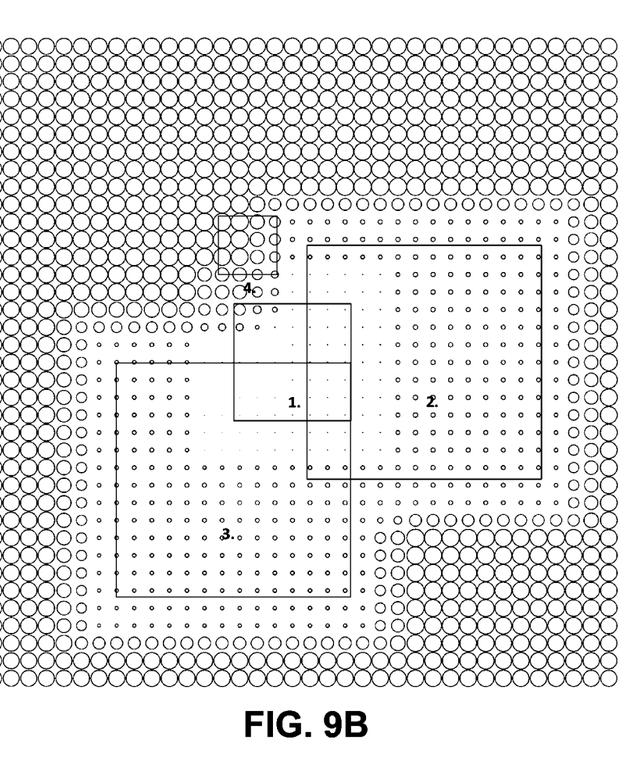
FIG. 9B depicts calculated weights at screen points using a method shown in FIG. 9A.

In the method shown in FIG. 9A, the help information can be placed on the mask in order from largest to smallest to ensure that the largest help content have the best chance at being placed in a location without overlapping other labels or cutouts. Initially, locations where cutouts are removed from the mask region are reserved, so that poor scores will be given to those locations. This is done to avoid overlaps. After the placement of each help content is determined, the location into which they were placed is also reserved so that the next help content will not overlap the same space. In one embodiment, the center points of the closest sides of the help content relative to the associated user interface are connected by an arrow. FIG. 9B shows a visualization of the calculated weights using the method shown in FIG. 9A. The diameter of each bubble represents a weighted score at each sampled point (e.g., a larger diameter represents a higher weight). Space 1 shown in FIG. 9B shows a user interface element, such as a command, near which the help content should be placed. Spaces 2 and 3 represent reserved space where the help content should not be placed. Space 4 shows the calculated placement location of the help content such that it is near the associated user interface element in space 1 but does not overlap with the reserved spaces 2 and 3 shown in FIG. 9B.

Figure 10:
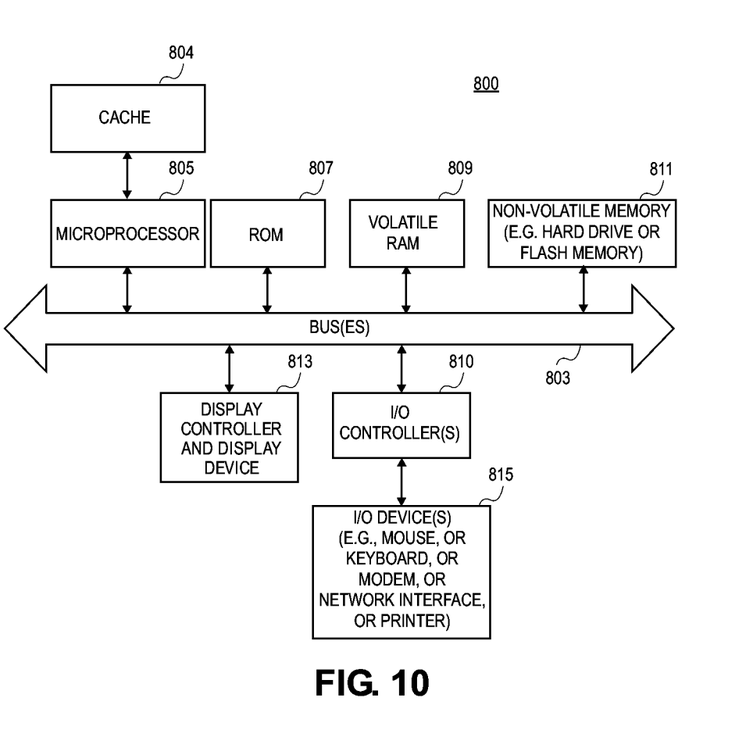
FIG. 10 shows an example of a data processing system that can be used to implement one or more embodiments described herein.

FIG. 10 shows one example of a data processing system 800, which may be used with one embodiment. For example, the system 800 may be implemented to provide a help system or device that performs the methods of any one of FIG. 6, 7, 8, or 9A or displays and creates the help systems shown in FIGS. 4A, 4B, 5A and 5B. Note that while FIG. 10 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 10, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 10 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method for operating a computer program, the method comprising:
receiving a user input to invoke a help system for the computer program;
displaying a user interface (UI) of the computer program with one or more masks over portions of the UI and displaying one or more cutouts around other portions of the UI, the portions of the UI not selectable while under the one or more masks, the other portions of the UI are selectable while in the one or more cutouts, and the one or more cutouts appearing to be cut out of the one or more masks; and
displaying dynamically positioned help information on the one or more masks, the help information being dynamically positioned in response to user interaction with the computer program and being positioned to avoid overlap among each instance of help information;
wherein the help information is dynamically positioned by a method comprising:
sorting each item of the help information based on screen space size to be occupied by each item;
sampling available screen space at a plurality of points in the computer program's screen space;
ranking each of the plurality of points based on one or more criteria; and
positioning each item of the help information based on the ranking.

2. The non-transitory machine readable medium as in claim 1, wherein the criteria comprise one or more of: (1) overlap with the one or more cutouts; (2) distance from the associated UI to a potential location; or (3) overlap with a reserved location; or (4) a preferred direction from the associated UI to the item.

3. The non-transitory machine readable medium as in claim 2, wherein the sampling is performed in two phases and the two phases comprise: a first sampling at a first resolution of an entire screen size of the computer program; and then a second sampling around highest ranked locations from the first sampling, the second sampling at a second resolution that is higher than the first resolution.

4. The non-transitory machine readable medium as in claim 3, wherein the positioning is based on the highest ranking score.

5. The non-transitory machine readable medium as in claim 3, wherein once an item of help information is positioned at a first location, the first location is reserved in future rankings.

6. The non-transitory machine readable medium as in claim 5, wherein the UI of the computer program comprises a plurality of cutouts.

7. The non-transitory machine readable medium as in claim 2, wherein the one or more cutouts that are displayed are based upon a selected state of the computer program.

8. The non-transitory machine readable medium as in claim 7, wherein the selected state is based upon a command selected by user input from the computer program's ribbon at a top of the computer program's window, and wherein the selection of the selected state can vary during the time that the help system is invoked, resulting in different cutouts depending upon the selected state.

9. The non-transitory machine readable medium as in claim 8, wherein the item of the help information is dynamically positioned in response to user input that positions a cursor over a UI element that is associated with the item, and the item is a roll over hint displayed on the one or more masks.

10. The non-transitory machine readable medium as in claim 9, wherein a user is not constrained in an order in which states are selected while the help system is invoked and the help system does not enforce a workflow.

11. The non-transitory machine readable medium as in claim 2, wherein the one or more cutouts are not limited to quadrilaterals.

12. The non-transitory machine readable medium as in claim 1, an item of the help information is dynamically positioned in response to user input that positions a cursor over a UI element that is associated with the item.

13. A method for operating a computer program, the method comprising:
receiving a user input to invoke a help system for the computer program;
displaying a user interface (UI) of the computer program with one or more masks over portions of the UI and displaying one or more cutouts around other portions of the UI, the portions of the UI not selectable while under the one or more masks, the other portions of the UI are selectable while in the one or more cutouts, and the one or more cutouts appearing to be cut out of the one or more masks; and
displaying dynamically positioned help information on the one or more masks, the help information being dynamically positioned in response to user interaction with the computer program and being positioned to avoid overlap among each instance of help information;
wherein the help information is dynamically positioned by a method comprising:
sorting each item of the help information based on screen space size to be occupied by each item;
sampling available screen space at a plurality of points in the computer program's screen space;
ranking each of the plurality of points based on one or more criteria; and
positioning each item of the help information based on the ranking.

14. The method as in claim 13, wherein the criteria comprise one or more of: (1) overlap with the one or more cutouts; (2) distance from the associated UI to a potential location; or (3) overlap with a reserved location; or (4) a preferred direction from the associated UI to the item.

15. The method as in claim 14, wherein the sampling is performed in two phases and the two phases comprise: a first sampling at a first resolution of an entire screen size of the computer program; and then a second sampling around highest ranked locations from the first sampling, the second sampling at a second resolution that is higher than the first resolution.

16. The method as in claim 15, wherein the positioning is based on the highest ranking score.

17. The method as in claim 15, wherein once an item of help information is positioned at a first location, the first location is reserved in future rankings.

18. The method as in claim 17, wherein the UI of the computer program comprises a plurality of cutouts.

19. The method as in claim 14, wherein the one or more cutouts that are displayed are based upon a selected state of the computer program.

20. A non-transitory machine readable medium storing executable program instructions which when executed by a data processing system cause the data processing system to perform a method for operating a computer program, the method comprising:

receiving a user input to invoke a help system for the computer program;

displaying a user interface (UI) of the computer program with one or more masks over portions of the UI and displaying one or more cutouts around other portions of the UI, the portions of the UI not selectable while under the one or more masks, the other portions of the UI are selectable while in the one or more cutouts, and the one or more cutouts appearing to be cut out of the one or more masks;

displaying dynamically positioned help information on the one or more masks, the help information being dynamically positioned in response to user interaction with the computer program and being positioned to avoid overlap among each instance of help information; and     wherein the dynamically positioned help information comprises (a) a first help information in a first position, the first help information associated with a first cutout, and (b) a second help information in a second position that is different than the first position, the second help information associated with a second cutout, and the first help information being different than the second help information;

wherein the first and the second cutouts that are displayed are based upon a selected state of the computer program, and wherein the selected state is based upon a command selected by user input from the computer program's ribbon at a top of the computer program's window, and wherein the selection of the selected state can vary during the time that the help system is invoked, resulting in different cutouts depending upon the selected state.

\* \* \* \* \*